April 28, 1925.
M. H. PADE
1,535,338
CONVEYER FOR TIRE FACTORIES
Filed March 17, 1920     5 Sheets-Sheet 1
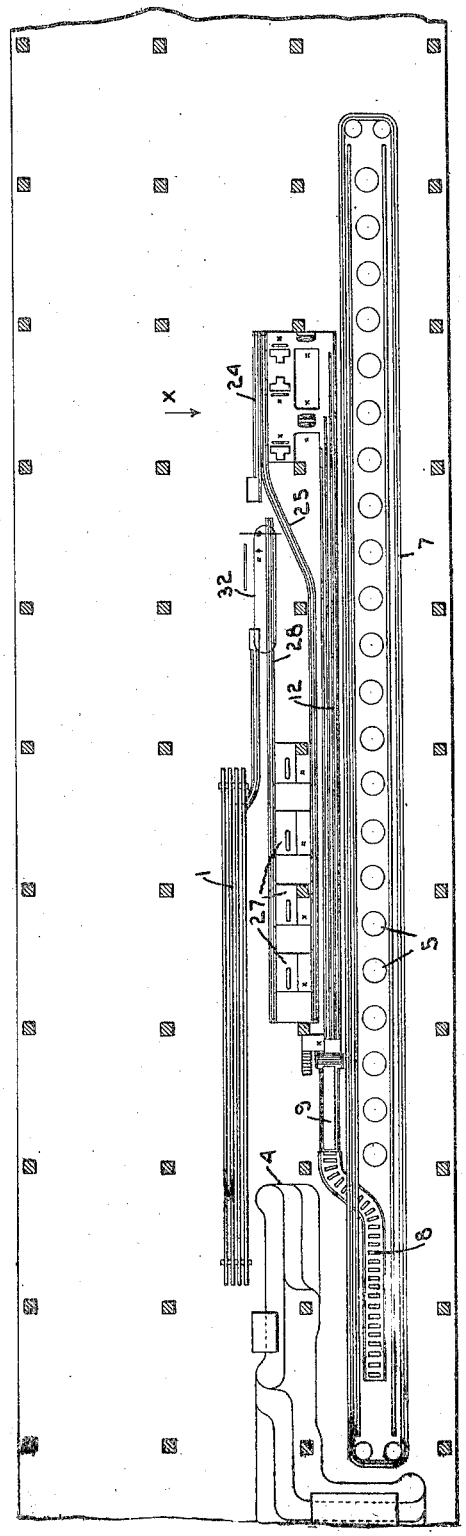
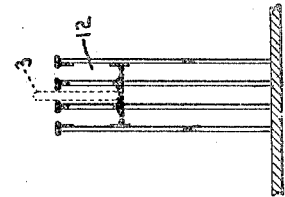
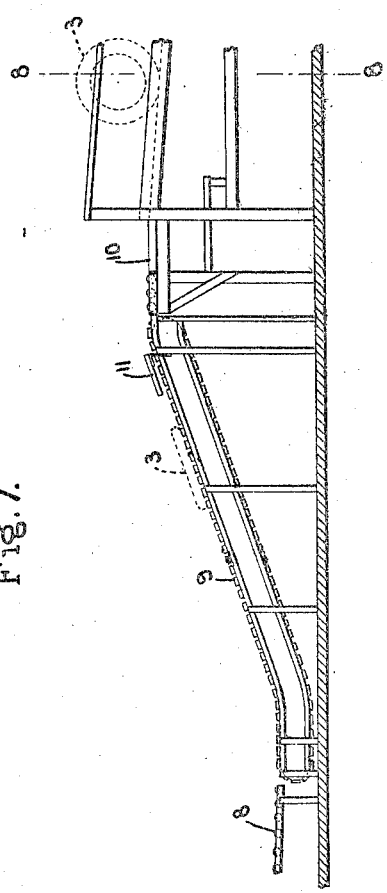
Inventor.
Max H. Pade
by G. L. Ely
Atty.

April 28, 1925.
M. H. PADE
1,535,338
CONVEYER FOR TIRE FACTORIES
Filed March 17, 1920   5 Sheets-Sheet 2
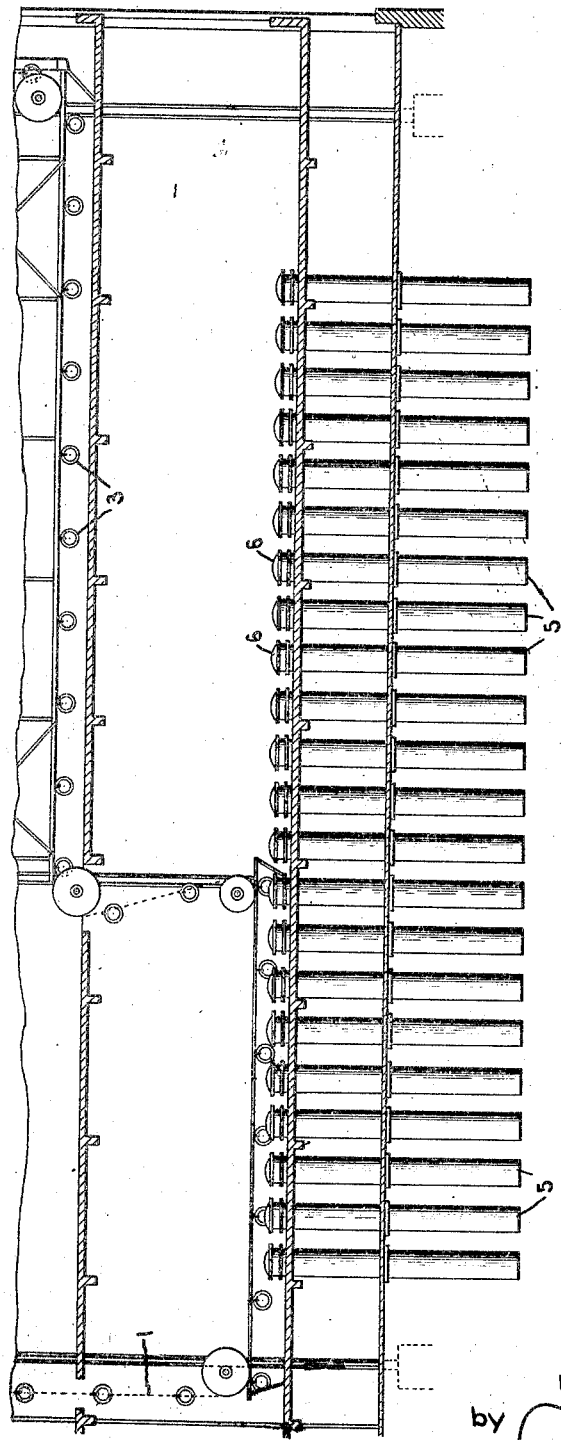
Inventor.
Max H. Pade

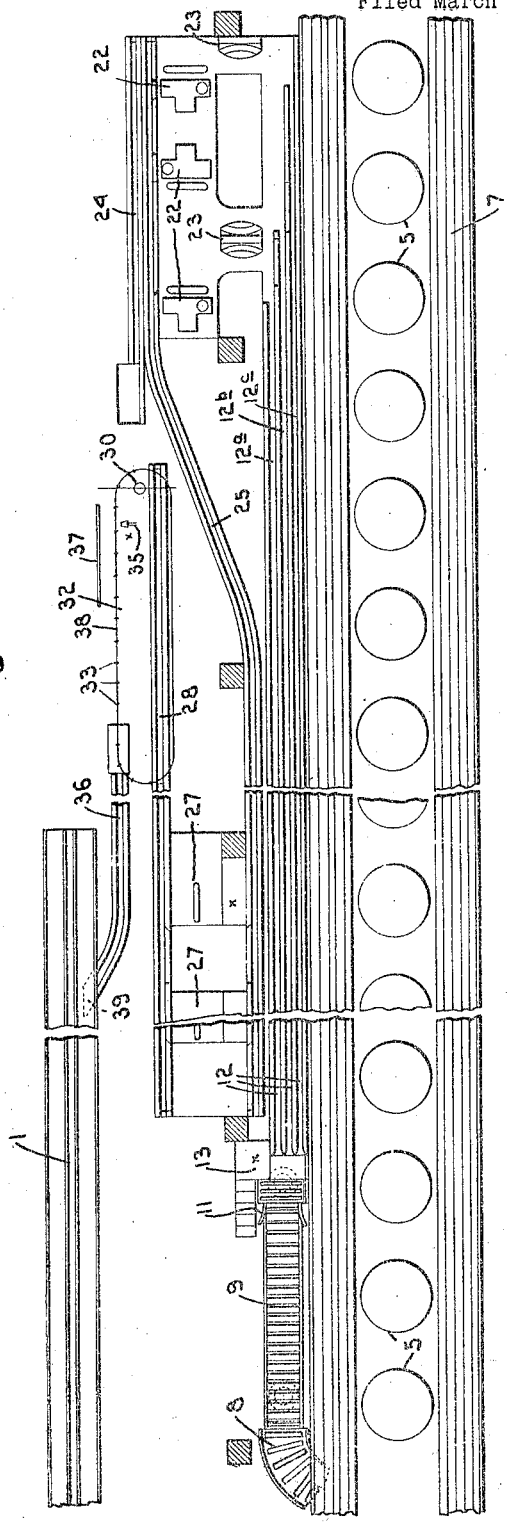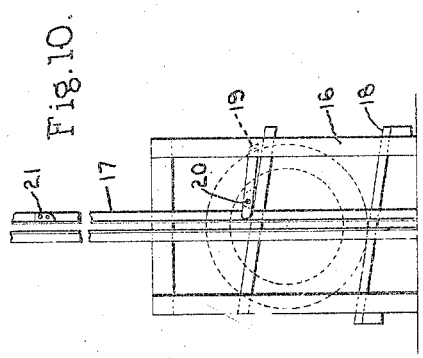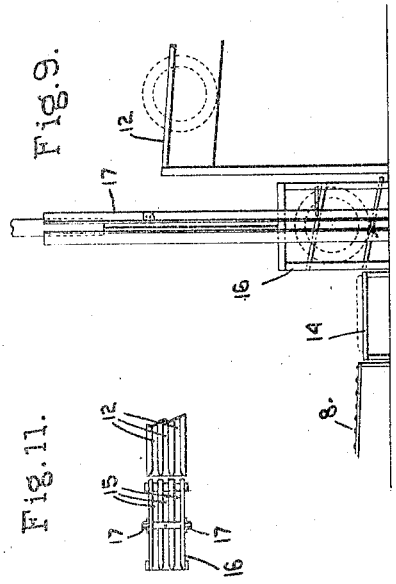

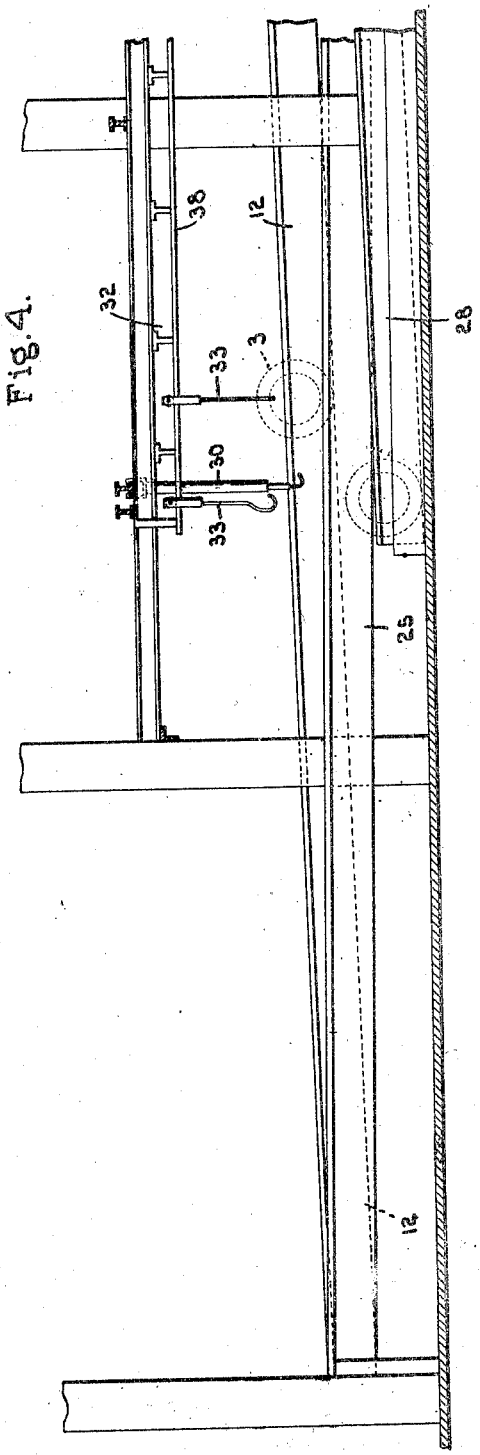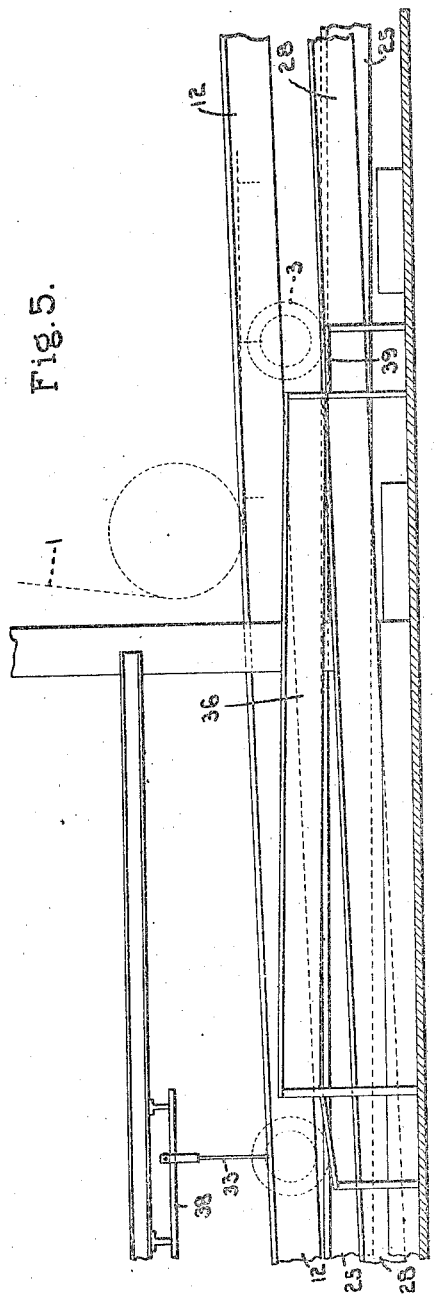

April 28, 1925.

M. H. PADE

CONVEYER FOR TIRE FACTORIES

Filed March 17, 1920    5 Sheets-Sheet 5

1,535,338

Inventor.
Max H. Pade
by
Atty.

Patented Apr. 28, 1925.

1,535,338

UNITED STATES PATENT OFFICE.

MAX H. PADE, OF AKRON, OHIO, ASSIGNOR TO THE FIRESTONE TIRE AND RUBBER COMPANY, OF AKRON, OHIO, A CORPORATION OF OHIO.

CONVEYER FOR TIRE FACTORIES.

Application filed March 17, 1920. Serial No. 366,595.

*To all whom it may concern:*

Be it known that I, MAX H. PADE, a citizen of the United States, residing at Akron, in the county of Summit, State of Ohio, have invented certain new and useful Improvements in Conveyers for Tire Factories, of which the following is a specification.

This invention relates to conveyer mechanism especially for use in tire factories, although it is applicable to other industries where similar or analogous operations are performed. The mechanism here shown is especially adapted for use in the steps of tire manufacture subsequent to the curing operation, and is designed to transport the cores and tires after they have been removed from the molds to a number of stripping machines or stations selectively, where the tires are stripped from the cores. From the stripping machines or stations a conveyer removes the tires to the place where they are given the final inspection before shipment, and a second conveyer takes the cores to a plurality of cleaning machines. From the cleaning machines the cores are moved by a second conveyer through a cooling station, are dried, cemented, and returned to the main tire conveyer in the factory by which they are carried to the building room.

In the drawings there are shown such portions of a tire factory as will enable the construction and operation of the present invention to be understood, and while the present conveyer mechanism cooperates as a part of the whole system disclosed and renders it more efficient, it will be understood that the mechanism of this invention is not limited for use with the other parts of the system, but may be adaptable for tire factories planned and laid out to operate upon different principles. It will also be understood that while quite detailed the invention may be modified and changed as will be apparent to one skilled in the art, without departing from the essential features of the invention.

In the drawings:

Fig. 1 is a plan view of one floor of a tire factory in which the vulcanization of the tire is effected, equipped in accordance with my invention.

Fig. 2 is a side elevation.

Fig. 3 is an enlarged plan of a portion of the device shown in Fig. 1, parts being broken out to reduce the length of the figure.

Figure 6:
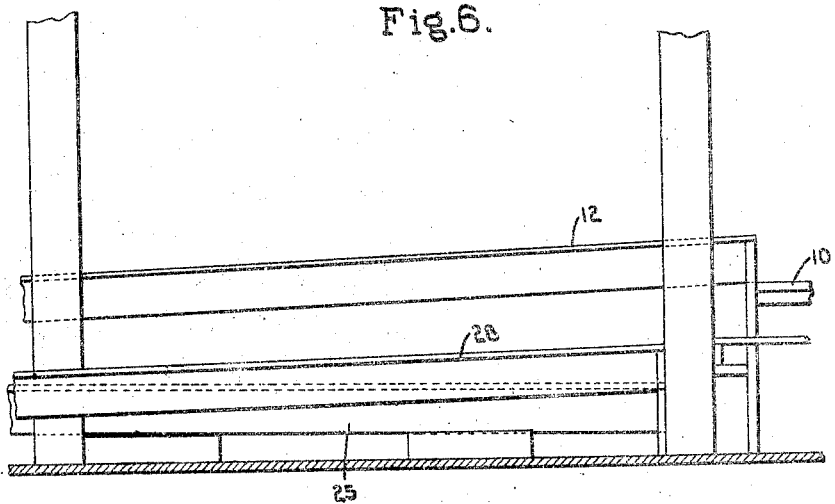

Figs. 4, 5, and 6 are side elevations of the device taken in the direction of the arrow X in Fig. 1, the several figures being continuations in the order named.

Fig. 7 is an elevation of the conveyer for bringing the core with the cured tire thereon to the upper level of the conveyer system.

Fig. 8 is a section of the cured tire runway on line 8—8 of Fig. 7.

Fig. 9 is an elevation of a substitute or modification of Fig. 7.

Fig. 10 is an enlarged side elevation of Fig. 9.

Fig. 11 is a plan of Figs. 9 and 10.

Figure 12:
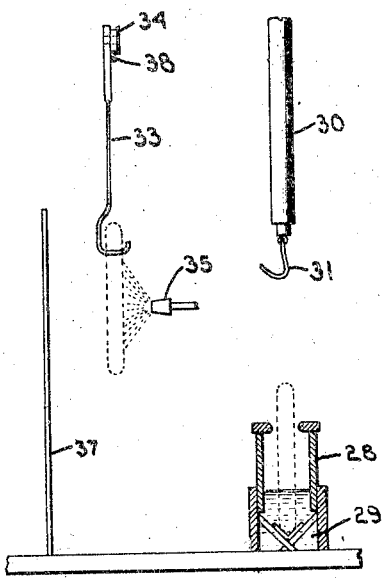

Fig. 12 is a cross section through the cooling tank and dryer.

Figure 13:
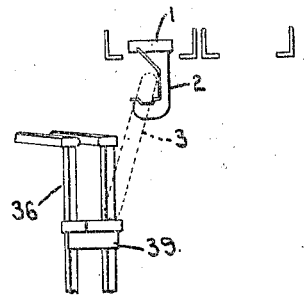

Fig. 13 is a view showing the manner of reloading the cleaned, dried, and cemented core on the main tire conveyer for delivery to the tire building room.

It will be understood that the present invention relates to a unit in a system of continuous tire building in which the operations are carried out in sequence on the cores while they are kept moving, and conveyers or runways are used in moving the cores from station to station, or operation to operation. By the novel arrangement and construction of the conveyers, it is possible to reduce the number of operations to a minimum and eliminate trucking and handling of the cores and tires to a great extent. By the use of the conveyers here shown, the cost of operating the tire factory is greatly reduced and a maximum production is obtained from the equipment.

In the drawings 1 represents what will be termed the main tire conveyer by which the cores with the green or uncured tires thereon are brought down from the upper floors of the tire factory to the vulcanizing or curing room, and by which the cores, cleaned, and cooled after the tires are removed in vulcanized condition, are returned to the building and finishing departments. From the conveyer 1 depend a plurality of hooks or supports 2, on which the cores 3 may be hung.

As the cores, or green tires, reach the lower floor of the building, or the curing room, they are removed from the conveyer 1 and placed on a storage conveyer 4. This conveyer 4 may be of any suitable design for the storage of tires and the preparation for filling the molds, and, as it forms no part of the present invention, will not be described here.

Arranged in the vulcanizing room is a plurality of open top vulcanizers 5, the top 6 of which may be lifted to permit loading and unloading. These vulcanizers are preferably arranged in a row and are surrounded by a conveyer 7 on which the molds are carried. Any number of vulcanizers may be used, twenty-two being shown which has been found to be the correct number for certain classes of tires requiring given cures. The vulcanizers are of the well-known hydraulic type and the molds are the ordinary two piece molds which are carried around on the conveyer 7. The arrangement is such that one vulcanizer is being filled and one emptied at all times. This arrangement makes possible a continuous stream of molds into and out of the vulcanizers at all times.

At that portion of the conveyer 7 opposite the storage conveyer, the molds are opened, the cured tires removed, the molds cleaned and a fresh uncured tire placed in the mold. At this point an extension of the conveyer 7 beyond the vulcanizers is shown and a roller conveyer 8 is provided upon which the cured tires upon the cores are placed and lowered by gravity outside of the conveyer 7.

The conveyer 8 delivers the hot cured tires on the core as received from the vulcanizers to an elevating mechanism such as shown in Fig. 7 or in Figs. 9 to 11 inclusive.

The form shown in Fig. 7 comprises a moving platform conveyer 9 which is inclined upwardly enough to give the proper fall for the tires in their subsequent movements through the system. This conveyer delivers the cores on a platform 10, guide 11 being placed at the upper end of the conveyer to direct them. From the platform 10 the cores are delivered to a plurality of downwardly inclined distributing conveyers 12, it being preferable to place them vertical so that they may roll by gravity to the places assigned to them. Any number of distributing conveyers may be used, but it has been found that three will answer the purpose. The operator for the purpose of allocating the cores stands at 13, which may be termed a distributing station.

The substitute or modified elevating mechanism is shown at Figs. 9, 10, and 11 and comprises a holder or cage 14 to which the cores are delivered by the conveyer 8, and at which point the cores are raised to vertical position and placed in any one of three compartments 15 in a cage 16. This cage is elevated by any suitable means in guides 17 and delivers the cores to the distributing conveyers 12. The floor 18 of the cage is inclined, the cores being retained in the cage by a lock or bail 19 pivoted to the side of the cage at 20. On the upper end of the guide 17 is a dog or lug 21 which, when the cage reaches the top of its travel, strikes the bail and raises it, releasing the cores so that they roll into the distributing conveyers 12. The compartments 15 in the cage correspond and align with the conveyer 12, so that the operator at the platform 13 is an effectual distributing operator.

The conveyer 12, which is composed of three separate conveyers or chutes 12$^a$, 12$^b$, and 12$^c$, distributes the cores and tires to separate tire stripping stations which are arranged below the level of the platform 10. The tire stripping machines are designated by the numeral 22 and at these machines, the tires are stripped from the cores. The stripping machines may be of any preferred type, that indicated being of a form designed to strip the tires in vertical position. Before being transferred to the stripping machines, the tires and cores are prepared for stripping at 23, which represents stations, preferably arranged at the level of the stripping stations 22, where the tire is slightly loosened from the core and soaped in order to facilitate removal by the machines.

When the tire has been removed from the core and the latter released from the machine, the tire is placed on a conveyer 24 by which it is conducted to the place where the final inspection is given and the tire prepared for the market.

The cores are placed in a conveyer 25, that is oppositely inclined relative to the conveyers 12, and by which they are conducted to a cleaning station comprising a plurality of core cleaning machines 27. These machines may be of any type, but are preferably designed to act upon the core in a vertical plane. By the use of core cleaning machines at this time, the cores are thoroughly freed from the bits of rubber, cement, dirt and other particles which have adhered to it during the manufacture of the tire, and as this is done soon after the core is removed from the heater, and while it is still hot, the cleaning is performed effectually and easily.

The cleaned cores are now placed in a cooling conveyer 28, by which they are led through a cooling trough 29, in which a stream of water is kept in circulation. The cooling conveyers, it will be noted, are reversely inclined with respect to the conveyer 25. Over the lower end of the cooling conveyer is located a hoist 30 having a hook 31 which engages the core and lifts it on the level of a drying conveyer 32, which comprises a series of hooks 33 suspended from trolley wheels 34. The trolleys move on an elliptical track 38 which leads the core past a drying device 35, by which the water on the core is blown away, being backed up by a baffle plate 37. Other forms of drying mechanism may be substituted for the air blast device shown. After passing the dryer, the cores may be cemented for the building operation.

The conveyer 32 delivers the core to a transfer conveyer 36 that is oppositely inclined with respect to the cooling conveyer 28, and, by which it is brought to a loading platform 39. At this point an operator stands and lowers each core 3 on a hook 2 as it passes the platform.

By the use of the mechanisms herein described, the cores and tires are kept in a constant stream through the various devices by which the tires are removed from the cores and prepared for the building operations. The series of operations of stripping, cleaning, cooling, drying, and recementing of the core can be accomplished in approximately five minutes and it will be seen that the arrangement shown will enable the largest production to be obtained with the equipment. Furthermore, the number of operations required for the work is reduced to a great extent and trucking of the cores to various points is eliminated.

By the employment of gravity conveyers on which the cores are placed in vertical position, advantage is taken of the fact that the cores are circular and no expensive conveyer driving mechanism is employed, and the cores are presented to the several machines and devices in the position best suited for the machines.

Changes and modifications may be made in the specific form of device for handling the cores and tires and the invention is not confined to the exact forms herein shown. Such alterations and modifications as fall within the scope of the invention are intended to be covered herein. The number and arrangement of the various machines at the several stations may be varied as conditions in individual cases may dictate.

I claim:

1. Apparatus for transporting articles to a plurality of stations, one of which comprises a series of heating units, said apparatus comprising, in combination, a horizontally disposed conveyer surrounding the units, a platform above the conveyer comprising one of the stations, an elevator for lifting articles to the platform, and a gravity runway between the conveyer and the elevator.

2. Apparatus for transporting articles to a plurality of stations, one of which comprises a series of heating units, said apparatus comprising, in combination, a horizontally disposed conveyer surrounding the units, a plurality of inclined gravity runways for successively conveying articles between certain of said stations, each runway being oppositely inclined relative to its preceding runway, and means for raising the articles to the high point of the first of said runways.

3. Apparatus for transporting articles to a plurality of stations, one of which comprises a series of heating units, said apparatus comprising, in combination, a horizontally disposed conveyer surrounding the units, a plurality of inclined gravity runways for successively conveying articles between certain of said stations, each runway being oppositely inclined relative to its preceding runway, and means for raising the articles to the high point of the first of said runways, said means including devices for holding the articles in a vertical position.

4. Apparatus for use in transporting annular articles to a series of stations, one of which comprises a series of heating units, said apparatus comprising, in combination, a horizontally disposed conveyer surrounding the units, a plurality of inclined runways for successively conveying the articles between certain of said stations, each runway being oppositely inclined relative to its preceding runway, and means for raising the articles to the high point on one of said runways in a position to roll thereon, said means including automatically actuated devices for releasing the articles.

5. Apparatus for use in transporting annular articles to a series of stations, one of which comprises a series of heating units, said apparatus comprising, in combination, a horizontally disposed conveyer surrounding the units, a plurality of parallel inclined runways for successively conveying the articles between certain of said stations, each runway being oppositely inclined relative to its preceding runway, and means for raising the articles to the high point on one of said runways in a position to roll thereon, said means including automatically actuated devices for releasing the articles.

6. Apparatus for use in transporting annular articles to a series of stations, one of which comprises a series of heating units arranged in a row, said apparatus comprising, in combination, a horizontally disposed conveyer surrounding the units, a plurality of laterally spaced inclined runways disposed in parallelism with the row of heaters for successively conveying the articles between certain of said stations, each runway being oppositely inclined relative to its preceding runway, and means for raising the articles to the high point on one of said runways in a position to roll thereon, said means including automatically actuated devices for releasing the articles.

7. An apparatus for handling a plurality of tire cores, comprising a conveyer mechanism having means for sustaining the cores in vertical rolling position said mechanism being interrupted at a plurality of separated points which constitute stations for stripping the tires from the cores, cleaning and cooling the cores.

8. An apparatus for handling a plurality of tire cores comprising a conveyer mechanism having means for sustaining the cores in vertical rolling position, said mechanism being interrupted at a plurality of separated and successively lower points which constitute stations for stripping the tires from the cores, cleaning and cooling the cores, whereby the cores pass by gravity from end to end of the conveyer mechanism.

9. An apparatus for handling a plurality of tire cores, comprising a conveyer mechanism having means for sustaining the cores in vertical rolling position, said mechanism being interrupted at a plurality of separated and successively lower points which constitute stations for removing the tires from the cores, cleaning the cores and cooling the cores whereby the cores pass by gravity from end to end of the conveyer mechanism.

10. An apparatus for handling a plurality of tire cores, said apparatus comprising a gravity conveyer system having means for sustaining the cores in vertical rolling position, and a series of stations at which cores are prepared for re-use, said system being adapted to deliver the cores in a vertical position to the several stations in succession.

11. In a mechanism for the uses and purposes set forth, a conveyer, a stripping station, said conveyer conducting cores to the stripping station, a second conveyer conducting cores from the said station to a core cleaning station, both said conveyers permitting the cores to roll in vertical planes.

12. In a mechanism for the uses and purposes set forth, a conveyer comprising a guideway down which the cores may roll in vertical planes, stripping stations, said conveyer delivering the cores to said stripping stations in vertical position whereby they are ready to be stripped without tilting the plane of the core.

13. In an apparatus for handling tire cores a conveyer adapted to support the core with the tire thereon in a vertical plane, and a tire stripping station to which said conveyer delivers the core without tilting the plane of the core.

14. In an apparatus for handling tire cores, a conveyer system adapted to support the core in a vertical plane and a tire stripping station at which the core is operated on in a vertical plane, said conveyer arranged to deliver the core to and to carry it from the stripping station without tilting the plane of the core.

15. In a device of the character set forth, a plurality of core stripping stations, a conveyer comprising a plurality of units, each unit delivering the cores in vertical position to one of said stations, a conveyer for conducting tires from the vicinity of vulcanizing stations, and a device between the two conveyers for allocating the cores to the several units.

16. In a device of the character set forth, a plurality of core stripping stations, a conveyer comprising a plurality of units each unit delivering to one of said stations, and a holder for the cores having compartments adapted to register with the several units.

17. In a device of the character set forth, a plurality of core stripping stations, a conveyer comprising a plurality of units each unit delivering to one of said stations, and a holder for the cores having compartments adapted to register with the several units, and means for delivering the cores from the holder into the units.

18. In an apparatus of the character set forth, a core delivering station, a stripping station, and a core cleaning station, a gravity conveyer mechanism adapted to conduct the cores to the several stations in succession, said conveyer mechanism being adapted to permit the cores to be detained at each of said stations until the work thereon is completed.

19. In a device of the character set forth, a distributing conveyer for cured tires on cores, a holder for the cores, a plurality of units in said conveyer, compartments in said holder registering with said units, means for releasing the cores into the units, and a plurality of tire stripping stations to which the units deliver.

20. In a device of the character set forth, a distributing conveyer for cured tires on cores, a holder for the cores, a plurality of units in said conveyer, compartments in said holder adapted to be brought into registration with said units, means for releasing the cores from the holder into the several units when the compartments are brought into registration, and a plurality of tire stripping stations to which the units deliver.

21. In a device of the character set forth, stations for stripping tires from cores and for cleaning the cores, a core cooling station, and a station at which the cores are prepared for reuse, and conveyer mechanism to transfer the cores in succession to the several operating points named.

22. In combination with means for removing cured tires from the vicinity of vulcanizers, and means for transporting cores for reuse, a conveyer mechanism for moving cores in a continuous stream in succession to stations at which tires are stripped and cores cleaned and cooled, said conveyer mechanism extending between and connecting the said means.

23. In combination with means for removing cured tires from the vicinity of the vulcanizers, and a conveyer for transporting the cores for reuse, a gravity conveyer mechanism for moving cores in a continuous stream in succession to stations at which tires are stripped and cores cleaned and cooled, said gravity conveyer being constructed and arranged to receive cores from said means and deliver them to said first mentioned conveyer.

24. In combination with means for removing curved tires from the vicinity of the vulcanizers, and a conveyer for transporting the cores for reuse, a gravity mechanism for moving cores in a continuous stream in succession to stations at which tires are stripped and cores cleaned and cooled while the cores are maintained in vertical planes, said gravity mechanism connecting said means to said conveyer.

MAX H. PADE.